United States Patent [19]
Simpson

[11] Patent Number: 5,506,702
[45] Date of Patent: Apr. 9, 1996

[54] HOLOGRAPHIC OPTICAL ELEMENT PROVIDING AN ARTIFICIAL STAR FOR AN OPTICAL SYSTEM

[75] Inventor: Albert P. Simpson, Rancho Palos Verdes, Calif.

[73] Assignee: Northrop Grumman Corporation, Los Angeles, Calif.

[21] Appl. No.: 224,220

[22] Filed: Apr. 7, 1994

[51] Int. Cl.⁶ .............................. G02B 5/32; G01C 21/02
[52] U.S. Cl. ............................ 359/15; 250/203.1; 359/19
[58] Field of Search .................................. 359/15, 17, 19, 359/13, 14, 18; 356/347; 250/203.1

[56] References Cited

U.S. PATENT DOCUMENTS

| | | | |
|---|---|---|---|
| 3,807,829 | 4/1974 | Close | 359/19 |
| 3,912,395 | 10/1975 | Voggenthaler | 356/124 |
| 4,021,662 | 5/1977 | Mimms | 250/203 |
| 4,270,044 | 5/1981 | Elwell, Jr. | 250/201 |
| 4,458,980 | 7/1984 | Ohki et al. | 359/19 |
| 4,712,851 | 12/1987 | Fusek et al. | 350/3.6 |
| 4,832,427 | 5/1989 | Nanba et al. | 359/19 |
| 5,182,659 | 1/1993 | Clay et al. | 359/19 |

Primary Examiner—Martin Lerner
Attorney, Agent, or Firm—Terry J. Anderson; Karl J. Hoch, Jr.

[57] ABSTRACT

An artificial star is disclosed for use with an optical system (10) that has at least one optical axis (14a). The optical system includes an entrance aperture (14) through which the at least one optical axis passes and a radiation detector (22) having a radiation receiving surface. The optical system also includes an optical train having at least one optical element (16, 18, 20). The at least one optical train is disposed for receiving radiation from the entrance aperture, for directing the received radiation along the at least one optical axis, and for focussing the received radiation onto the radiation receiving surface of the radiation detector. In accordance with the invention the optical system is provided with a source (26) of electromagnetic radiation that outputs a diverging beam (26a); and also with a holographic optical element (28) disposed at the entrance aperture for receiving the diverging beam, for collimating the diverging beam into a collimated beam (26b), and for directing the collimated beam into the at least one optical train to be parallel with the at least one optical axis. As a result, an image of the source is provided at the radiation receiving surface of the radiation detector, the image functioning as an optical reference, or artificial star, for the purposes of calibration, alignment, and/or system operation verification.

19 Claims, 8 Drawing Sheets

5,506,702

HOLOGRAPHIC OPTICAL ELEMENT PROVIDING AN ARTIFICIAL STAR FOR AN OPTICAL SYSTEM

FIELD OF THE INVENTION

This invention relates generally to optical systems and, in particular, to alignment, calibration, and fault detection apparatus and methods for optical systems.

BACKGROUND OF THE INVENTION

The use of stellar objects, such as stars and planets, for the calibration and alignment of optical systems is well known. However, the use of stellar objects is often restricted by atmospheric conditions and/or the physical location of the optical system.

As such, the generation of artificial alignment reference points has been employed to overcome the reliance on such naturally occurring references.

By example, in U.S. Pat. No. 3,912,395, entitled "Optical System Calibration Method", Voggenthaler discloses an optical system calibration method that directs a single beam of collimated light through a diffraction grating. This results in the generation of a plurality of diffracted wavefronts, and a creation of an artificial star field which enables a lens to be calibrated to correct the position of objects in a photographed scene, and to thus compensate for distortion.

In U.S. Pat. No. 4,270,044, entitled "Optical Reference Gyro", Elwell, Jr. discloses an optical reference gyro that emits a collimated beam which is directed onto an optical sensor at an objective. A corner reflector 44 is employed to direct the collimated beam. The beam creates an artificial star at the point of incidence of the focal plane of the sensor.

In U.S. Pat. No. 4,021,662, entitled "Laser Target Simulator", Mimms discloses the use of a concave spherical mirror which collimates the light energy from two LEDs and projects the light across the full aperture of a laser seeker. This target simulation technique is employed for evaluating point target tracking systems.

In U.S. Pat. No. 4,712,851, entitled "Positioning Alignment Apparatus and Method Using Holographic Optical Elements", Fusek et al. disclose the alignment of a subject in a space coordinate system. The technique of Fusek et al. employs at least one holographic optical element (HOE) for developing two beams of focussed light whose focal configurations appear in predetermined locations that correspond to the position of the subject in the system.

SUMMARY OF THE INVENTION

The present invention relates to a device which is capable of providing an optical reference for an optical system having at least one optical axis, the device includes a source of electromagnetic radiation providing a diverging beam. A holographic optical element is positioned to receive the diverging beam for collimating the diverging beam into a collimated beam, and for directing the collimated beam to be parallel with the optical axis.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

General Overview

Figure 1:
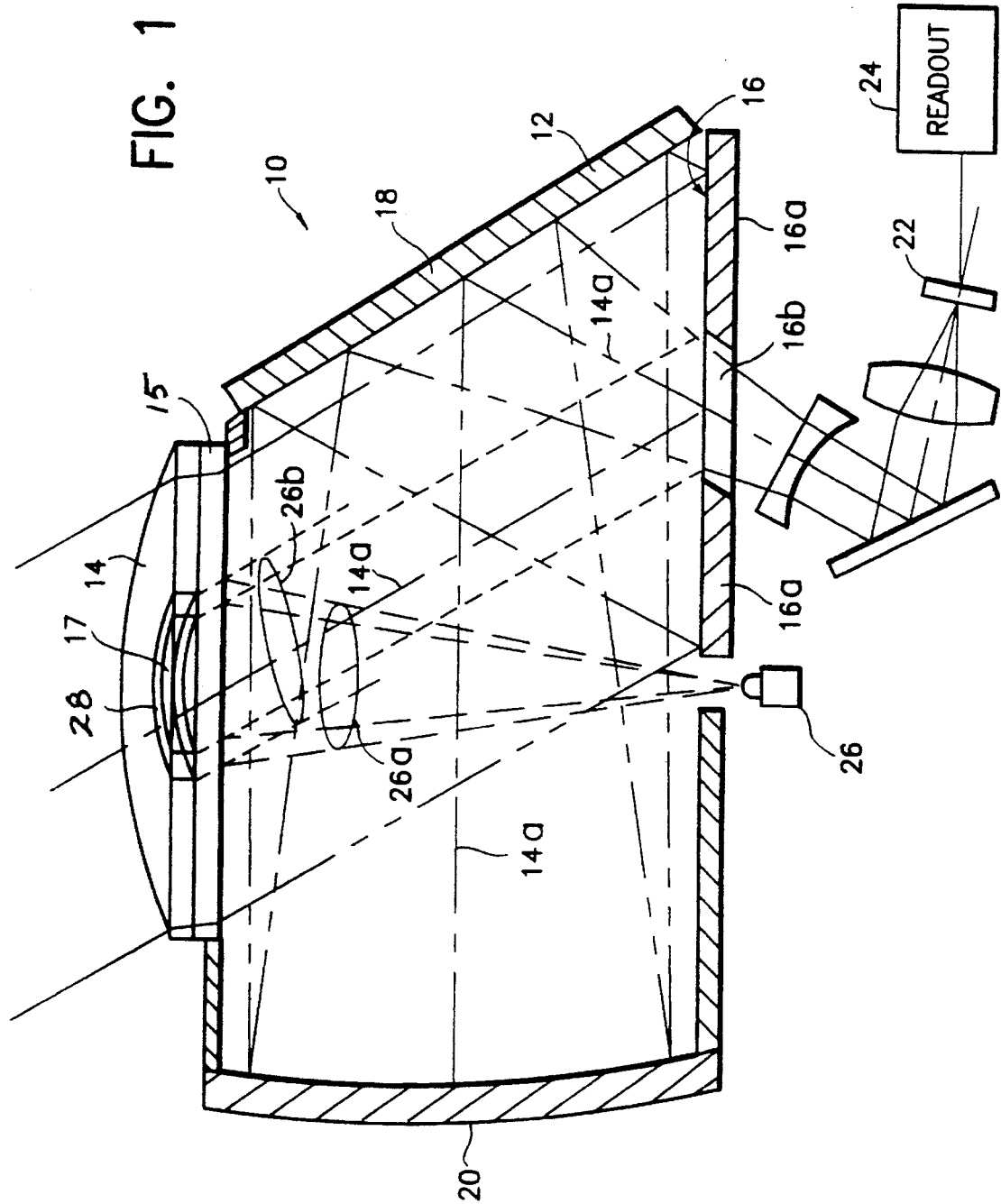
FIG. 1 illustrates a side view of one embodiment of an optical system, having an obscuration, that includes apparatus for generating an artificial star, the apparatus comprising a source of optical energy and a holographic optical element (HOE) 15; in this figure, the aperture 14 and the HOE 15 are illustrated in partial elevation view for ease of illustration.

This invention provides an artificial reference point which is used in an optical system to accomplish alignment, calibration, and/or fault detection functions. It is further desired that this invention provides an artificial star, or other image, through the use of a holographic optical element.

The present invention is realized by an apparatus and method that generates an artificial star for use with an optical system that has at least one optical axis. The optical system includes an entrance aperture through which the at least one optical axis passes and a radiation detector having a radiation receiving surface. The optical system also includes at least one optical train having at least one optical element. The optical train is disposed for receiving radiation from the entrance aperture, for directing the received radiation along the at least one optical axis, and for focussing the received radiation onto the radiation receiving surface of the radiation detector.

At least one holographic optical element is used in some of the embodiments. It is not necessary to have the holographic optical element located at the entrance aperture, it can be placed at any position in the optical system from which there is an optical path to the detector/sensor. It also does not have to be symmetrical about the optical path. The preferred position is near the entrance aperture since that makes the beam exiting the hologram traverse as many of the system optical elements as practical, and movement or failure of any one of the traversed elements can be detected. In addition, for this system the entrance aperture is the preferred position because the optical element there is a HOE sandwiched between two optical glass plates. In general, a preferred position in any optical system containing one or more holographic optical elements (HOEs), is at the location of either HOE, since this HOE can either be multiplexed to include the artificial star forming HOE, or the artificial star forming HOE can replace a small part of the original HOE.

In accordance with the invention the optical system is provided with a source of electromagnetic radiation that outputs a beam; and also with a holographic optical element disposed at the entrance aperture for receiving the beam, for collimating the received beam into a collimated beam, and for directing the collimated beam into the at least one optical train to be parallel with the at least one optical axis. As a result, an image of the source is provided at the radiation receiving surface of the radiation detector, the image functioning as an optical reference for the purposes of calibration, alignment, and/or system operation verification.

Relating To Specific Embodiments

In this disclosure, elements which perform similar functions may be provided with identical reference characters.

Referring to FIG. 1 there is shown an optical system 10 that is constructed and operated in accordance with this invention. Optical system 10 includes an enclosure 12 and an entrance aperture 14 that is formed within a wall of the enclosure 12. An optical axis (OA) 14a of the optical system 10 passes through the entrance aperture 14.

In the FIG. 1 embodiment of the optical system 10 an optical train is comprised of three reflectors 16, 18, and 20. Reflectors 16, 18, and 20 are provided for directing radiation that passes through the aperture 14 onto a radiation receiving surface of a radiation detector 22. Coupled to an output of the radiation detector 22 is a readout assembly 24. The radiation detector 22 is preferably embodied as a focal plane array (FPA) of discrete radiation detectors.

Entrance aperture 14 in the configuration of FIGS. 1 and 2 contains a transmission HOE 15 which acts as a Schmidt corrector plate introducing negative spherical aberration into the beam to compensate for the positive aberration introduced later by the spherical mirror. The HOE 28 which forms a calibration image in this application is formed as a small ring around an obscured area 17, which adds to or replaces any other HOE already present in the aperture 14. In FIG. 1, the HOE 15 and the entrance aperture 14 are illustrated in a partially elevational view to ease in the illustration. Thus, the optical system consists of four elements, 14, 16, 18, and 20. In this configuration, the hologram which forms the image of the artificial star source can be simply a portion of the HOE which is already there, but with a different exposure setup which creates different optical properties.

It should be realized that the three optical elements 16, 18 and 20 are exemplary only, and that an optical system that employs the teaching of this invention may contain more or less than this number of optical elements. In the illustrated embodiment element 16 is formed as a substantial flat reflector 16a with a perforation 16b formed therein to allow passage of light along the optical axis and the converging beam, element 18, and the element 20 is a concave reflector for focussing incident radiation upon the radiation receiving surface of the radiation detector 22. The use of the perforated element 16 results in the generation of an obscured area wherein radiation entering through the entrance aperture 14 is not imaged by the radiation detector 22.

In accordance with the invention, the optical system 10 includes a generator of an artificial star; the generator being comprised of an optical source 26 and a holographic optical element (HOE) 28. The source 26 may be embodied by an LED, an incandescent bulb, or a small reflective surface that reflects light from a source (not shown) located in another location. The light source is not limited to LEDs and incandescent bulbs, but may be any source which has sufficient output at the design wavelength of the HOE, e.g. a laser. LEDs, incandescent bulbs, and other non-monochromatic light sources may require a narrow-band filter for best operation. A monochromatic laser source would not require any filtration. The source 26 provides an object or image from which a diverging beam of light 26a emanates.

The HOE 28, in this embodiment of the invention, is a reflective device that is located for intercepting the diverging beam 26a. The HOE 28 is constructed in such a manner that it both collimates the diverging beam 26a and redirects it as a collimated beam 26b, in a direction parallel to the optical axis 14a of the system 10, into the optical train comprised of the reflectors 16, 18, and 20. As such, the HOE 28 is preferably located at, or near to, the entrance aperture 14. The redirected and collimated beam 26b then follows the identical optical path as does light entering the optical system 10 through the aperture 14. That is, the collimated optical beam 26b is imaged upon the radiation sensor 22 by the optical elements 16, 18, 18, and 20, just as light from an external, real object would be. The result is the formation of a focussed image of the source 26 upon the image sensor 22. This focussed image of the source 26 is referred to herein as an "artificial star" 30, and is usable for calibration and alignment purposes.

Figure 2:
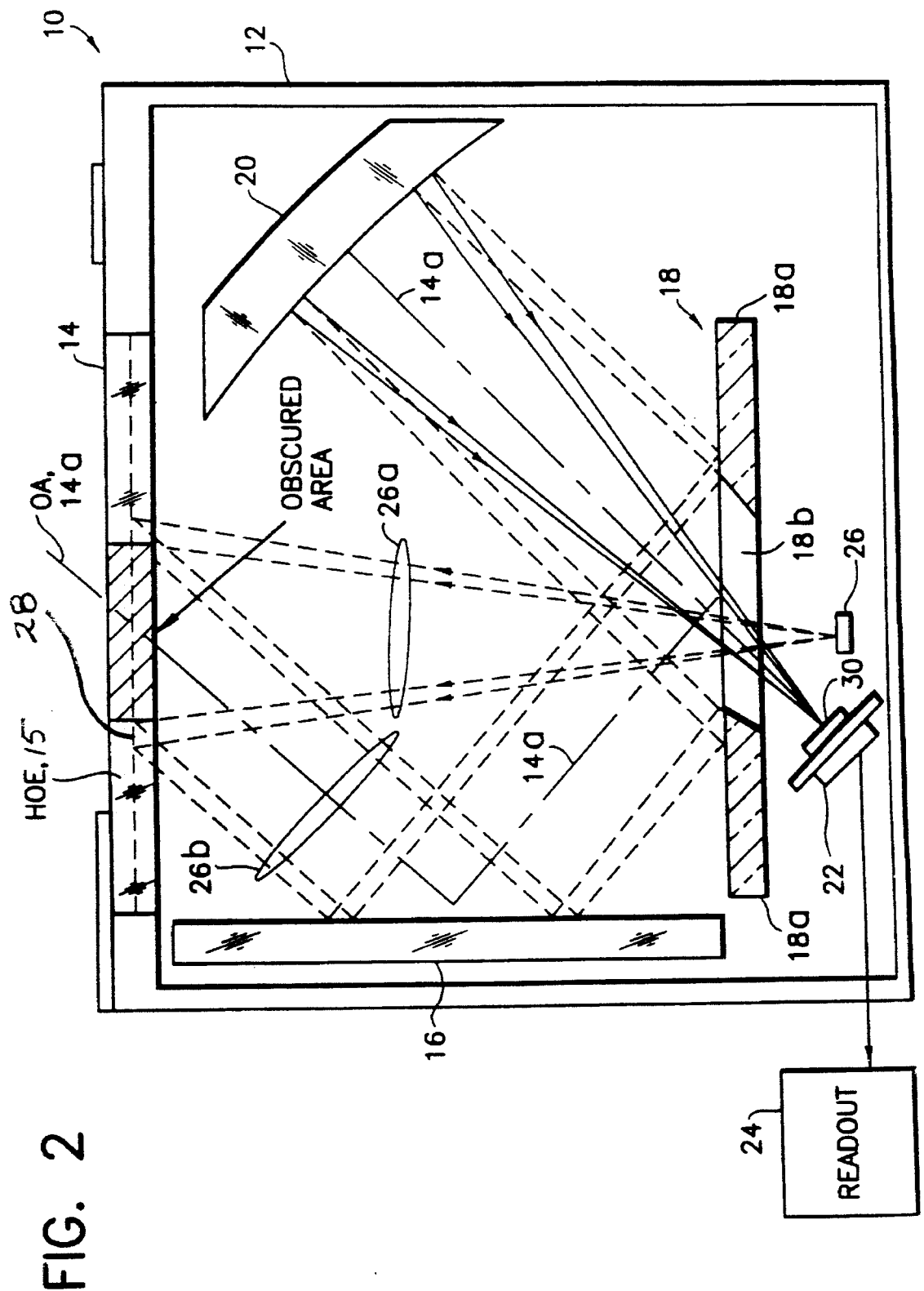
FIG. 2 illustrates a side view of one embodiment of an optical system, having an obscuration, that includes apparatus for generating an artificial star, the apparatus comprising a source of optical energy and a holographic optical element.

It should be realized that the embodiment shown in FIGS. 1 and 2 are exemplary only. For example, if the HOE 28 lies in the path of more than one optical train, each having an associated optical axis, the HOE 28 can also have the property that the diverging beam 26a is split into two or more collimated components. Each collimated component is thus individually directed along a separate one of the optical axes. As a result, multiple artificial stars can be provided from a single source 26 and a single HOE 28.

The artificial star 30 formed on the radiation sensor 22 can be used to verify that the image sensor 22 (and its associated readout electronics 24) is in proper operating condition. The image of the artificial star 30 can also be employed to provide a reference for the position of the optical axis 14a. This is accomplished by comparing the position of the image of the artificial star 30 on the radiation detector 22 with previously measured positions to detect a movement of the optical elements 16, 18, or 20, or the radiation sensor 22. It is also within the scope of the invention to reflect the focussed and collimated beam 14a from the radiation sensor 22 to provide a collimated beam that exits the optical system 10. The collimated beam can then be used to align, calibrate, or otherwise verify the operation of the optical system 10.

It should be noted that the teaching of the invention is not limited for use in the particular optical configuration shown in FIG. 1. For example, and depending on the geometry of the optical system, a transmissive HOE can be used in place of the reflective HOE 28. In general, the teaching of this invention can be employed to advantage in reflective (catoptric), refractive (dioptric), or mixed (catadioptric) optical systems. In optical systems having obscurations, as in FIG.

1, the source 26 and the reflective or transmissive HOE 28 are preferably located so that the obscured portion of the optics are utilized in generating the artificial star 30, thus minimizing or eliminating loss of light due to the inclusion of the artificial star generating components within the optical system.

Illustrated in FIG. 2 is an optical system 10 that is constructed and operated in accordance with an alternate embodiment of this invention. Optical system 10 includes an enclosure 12 and an entrance aperture 14 that is formed within a wall of the enclosure 12. An optical axis (OA) 14a of the optical system 10 passes through the entrance aperture 14 similar to the FIG. 1 embodiment.

In the FIG. 2 embodiment of the optical system 10 an optical train is comprised of three reflectors 16, 18, and 20. Reflectors 16, 18, and 20 are provided for directing radiation that passes through the aperture 14 onto a radiation receiving surface of a radiation detector 22. Coupled to an output of the radiation detector 22 is a readout assembly 24. The radiation detector 22 is preferably embodied as a focal plane array (FPA) of discrete radiation detectors.

In the FIG. 2 embodiment, element 16 is a flat reflector, element 18 is perforated flat reflector 18a with perforation 18b, and the element 20 is a concave reflector for focussing incident radiation upon the radiation receiving surface of the radiation detector 22. The use of the perforated optic 18 results in the generation of an obscured area wherein radiation entering through the aperture 14 is not imaged by the radiation detector 22.

The HOE 28, in this embodiment of the invention, is a reflective device that is located for intercepting the diverging beam 26a. The HOE 28 is constructed in such a manner that it both collimates the diverging beam 26a and redirects it as a collimated beam 26b, in a direction parallel to the optical axis 14a of the system 10, into the optical train comprised of the reflectors 16, 18, and 20. The result is the formation of a focussed image of the source 26 upon the image sensor 22. Reflector 18 is formed as a perforated plate 18a formed with a perforation 18b to permit passage of radiation from the source 26 and the image sensor 22.

Figure 3:
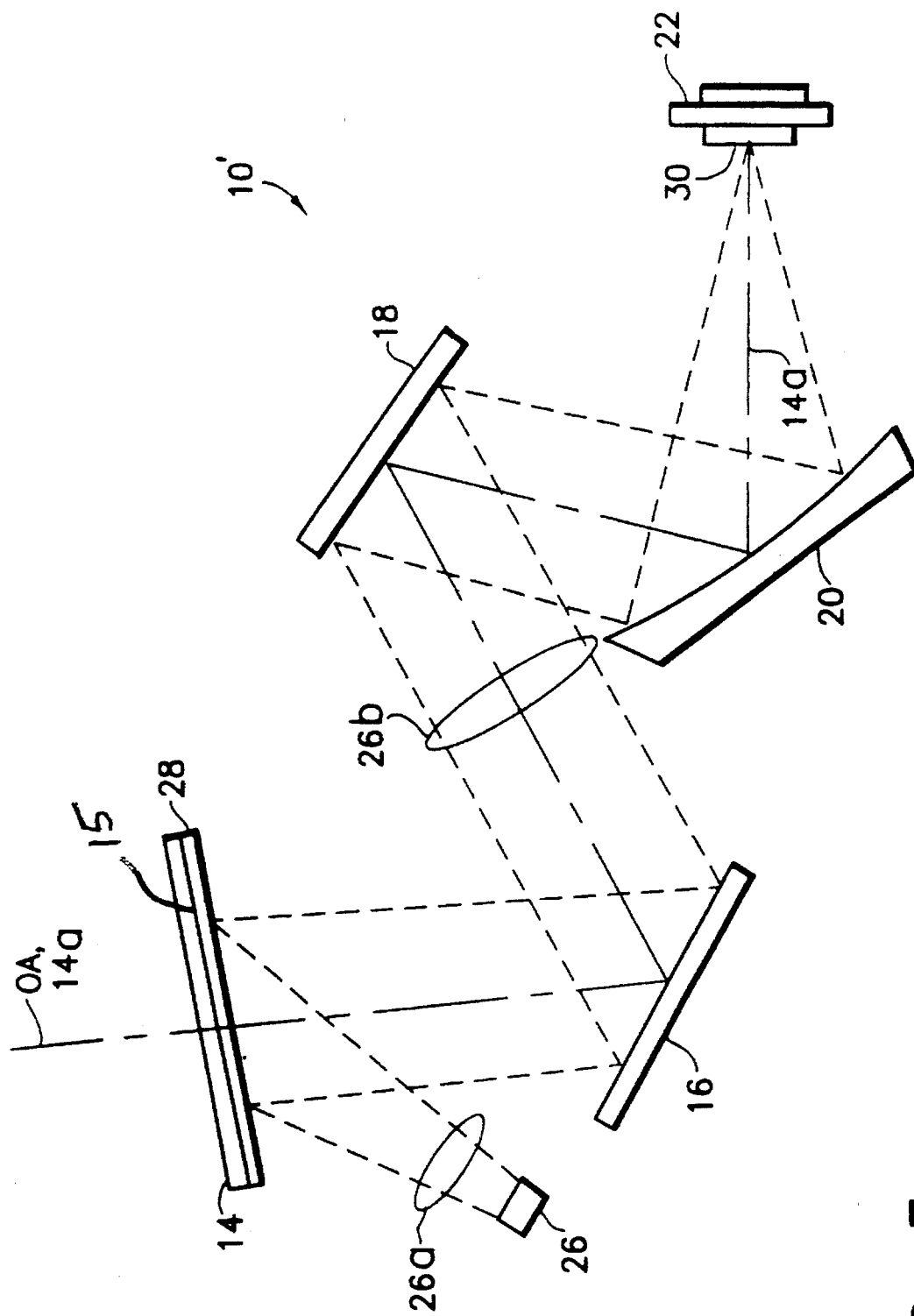
FIG. 3 is a top view of an alternate embodiment of optical system of the present invention, constructed without an obscuration, that includes a device for generating an artificial star.

In optical systems without obscuration nor enclosure 12, such as the optical system 10' illustrated in FIG. 3, the source 26 is preferably placed sufficiently far from the optical axis 14a (off-axis) so that no blockage of light occurs. In this embodiment, the HOE 28 corrects for the obliquity of the source 26 and also directs the collimated beam 26b so as to travel parallel to the optical axis 14a.

Figure 4:
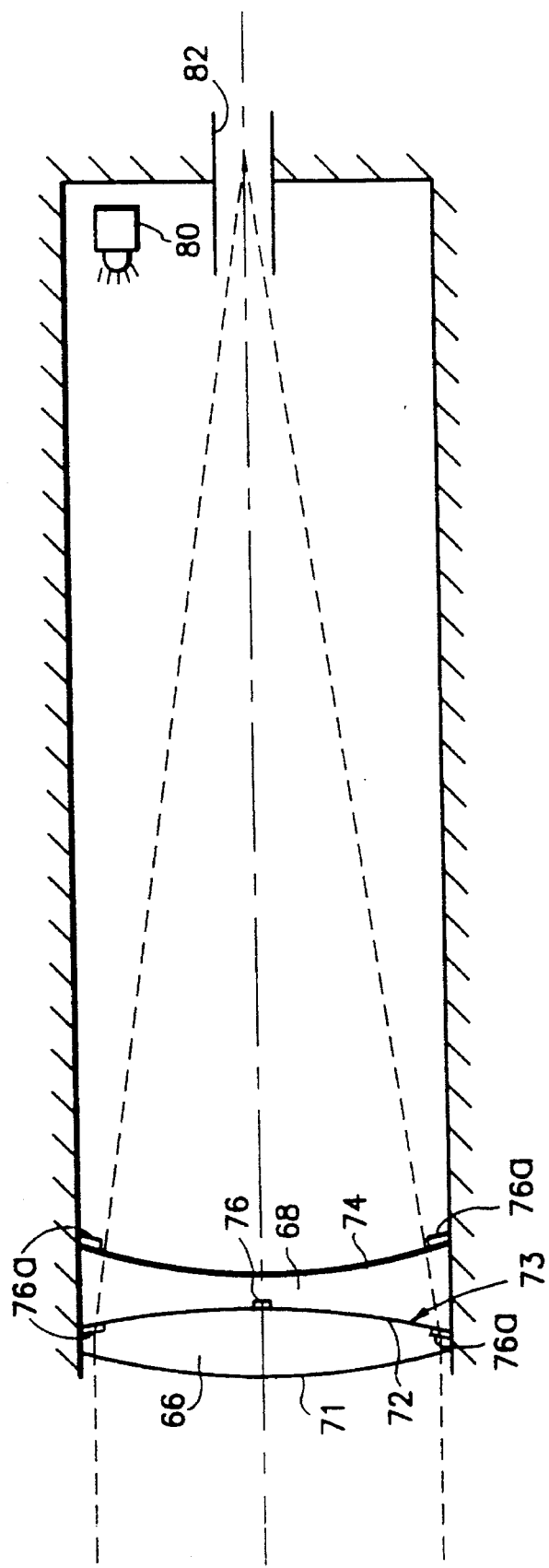
FIG. 4 is a top view of an alternate embodiment of optical system of the present invention, constructed without an obscuration, that includes a device for generating an artificial star.

An alternative configuration for an unobstructed system is the refractor telescope is shown in FIG. 4. Optical lens 66 includes surfaces 71 and 72. Optical lens 68 includes surfaces 73 and 74. A hologram 76 is placed between surfaces 72 and 73 where the surrounding lenses would provide protection from physical damage and moisture degradation (particularly important for a dichromated gelatin hologram). This would require permanent addition to the lens at the time of manufacture. The hologram (referred to in these positions as 76a ), could also be placed in the narrow unused ring at the outer edge of optical elements, or anywhere on the optical surface, since DCG holograms are both angle and wavelength selective, and light with different characteristics (e.g. other wavelengths, and along the normal optical path shown by the dotted lines) entering the hologram would be largely unaffected by the hologram, and would proceed along the normal optical path. A source 80 is positioned relative to the hologram 76 such that photonic radiation from the source 80 will reflect from hologram 76, and will appear at an optical port 82 at a desired position relative to the hologram 76.

In the embodiment of FIG. 4, the hologram could occupy a narrow ring outside the normal optical ray bundle. In this embodiment, the hologram would be placed on the outer perimeter (76a ) of lens surface 74, where convergence of the rays leaves a narrow unused ring.

Figure 5:
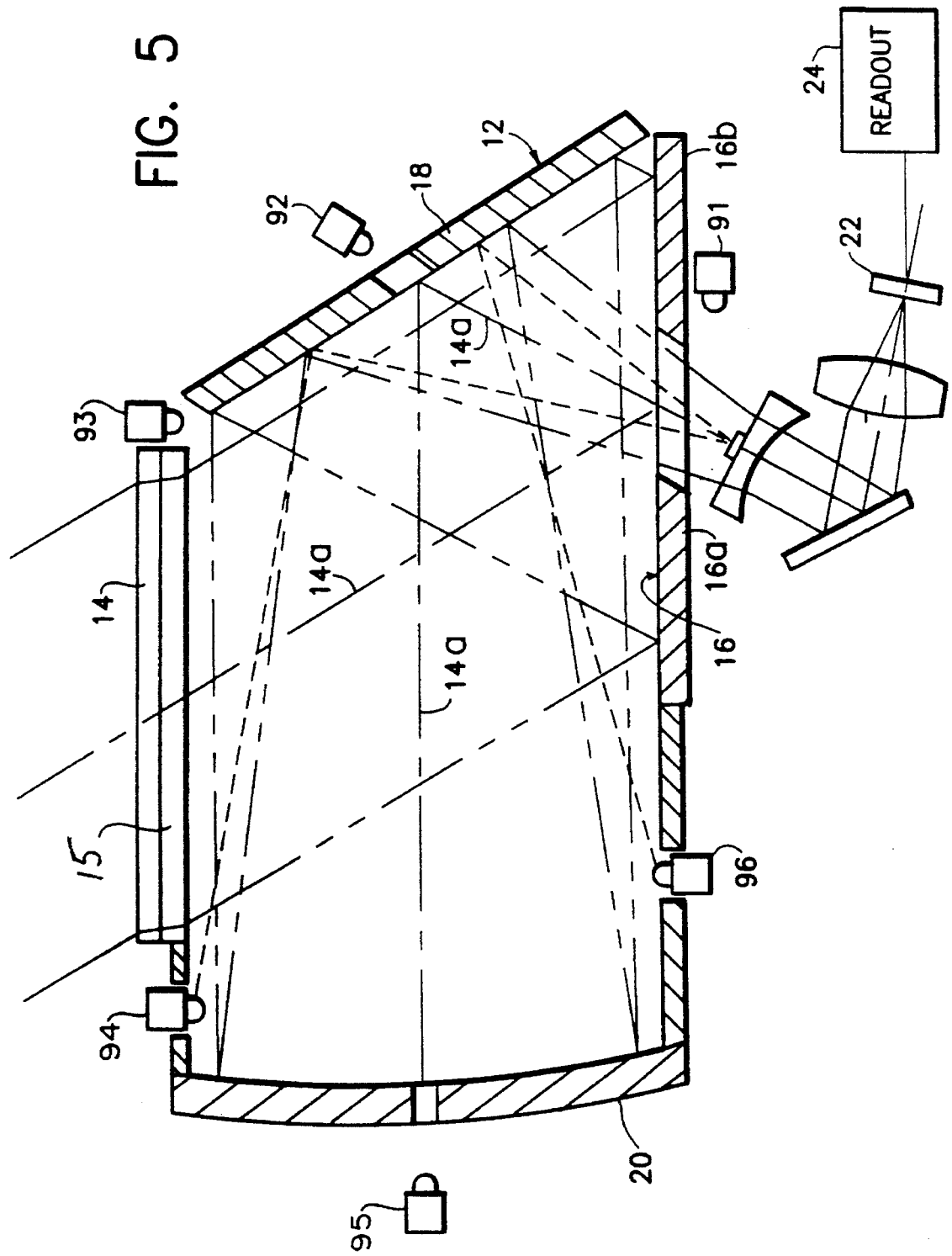
FIG. 5 illustrates a top view of yet another alternate embodiment of the optical system of the present invention.
Figure 6:
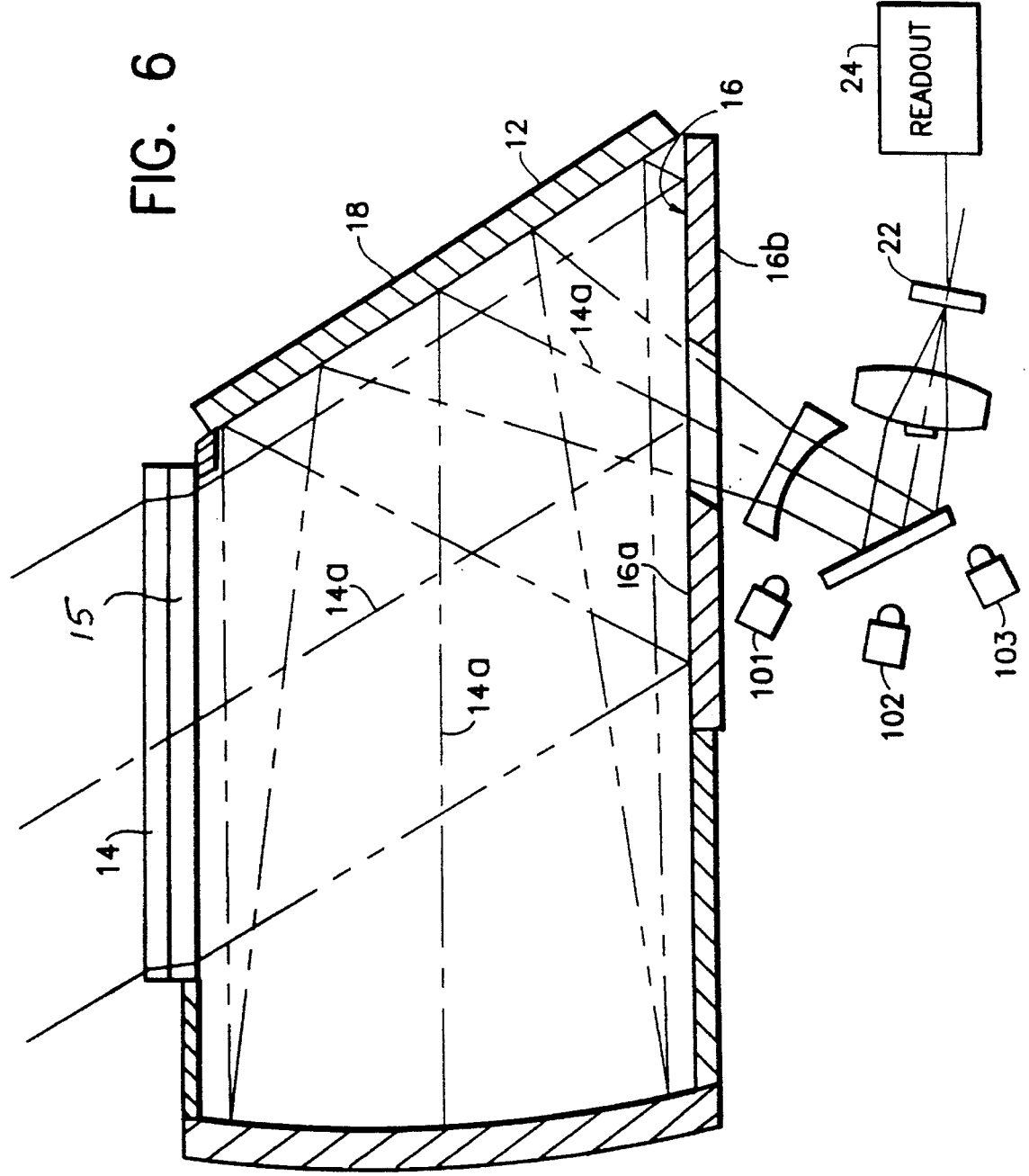
FIG. 6 illustrates a top view of another alternate embodiment of the optical system of the present invention.

FIGS. 5 and 6 show how a transmissive HOE could be used in the optical configuration of FIG. 1. In FIG. 5, the HOE is placed on one surface of the first corrector lens, and light sources located at positions 91, 92 and 93 give the optical rays a direct path to the HOE. Position 92 requires perforation of one optical element, and position 93 requires either mounting the light source inside the optical housing, or a hole through the housing. Positions 94, 95, and 96 do not give a direct path to the HOE, but require a reflection from one of the angled mirrors. Position 95 requires perforation of one optical element 20. The remaining elements (and their functions) are identical to that of the FIG. 1 embodiment.

In FIG. 6, the HOE is placed on one surface of the second corrector lens, and positions 101 and 103 give direct paths to the HOE. Position 102 requires perforation of the angled mirror. The remaining elements of the FIG. 6 embodiment functions identically to that of the FIG. 1 embodiment.

Non-Holographic Embodiments

In all previous embodiments, a HOE was part of the original optical system. The HOE (holographic optical element) forming the calibration image simply replaced or added to that hologram. In the following embodiments, no HOE is located in the optical system and one has to be added to form the image.

Figure 7:
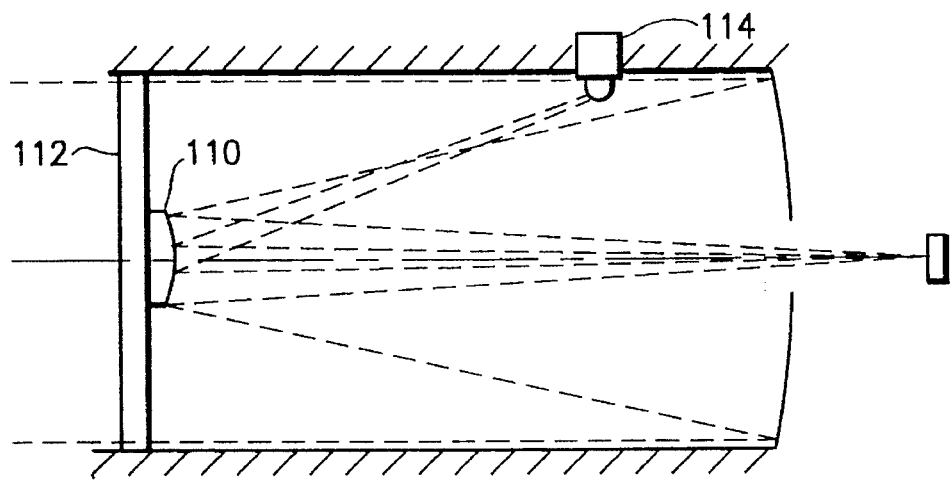
FIG. 7 illustrates a top view of an alternate embodiment of the optical system of the present invention.

One embodiment is shown in FIG. 7, where a HOE 110 occupies the central area of a secondary mirror 112 in a Schmidt-Cassegrain optical system. This is an unused portion of the secondary. In this application, the hologram would need, in addition to optical power to convert the diverging beam from a light source 114 (e.g. LED) into a collimated (parallel) beam, correction for spherical aberration, since the LED calibration/alignment beam does not pass through the Schmidt corrector.

Figure 8:
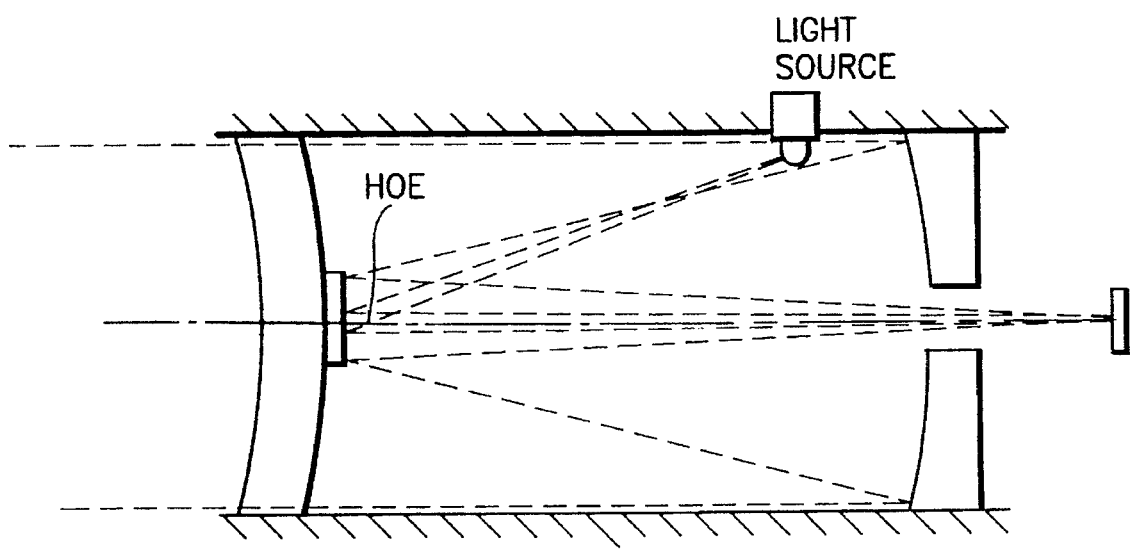
FIG. 8 illustrates a top view of yet another alternate embodiment of the optical system of the present invention.

Another embodiment of the present invention is shown in FIG. 8, where the optical configuration is a Maksutov-Cassegrain system, and the details of the invention are similar to that of FIG. 7. Like the embodiment of FIG. 6, the FIG. 8 embodiment requires spherical aberrations correction in the HOE.

Figure 9:
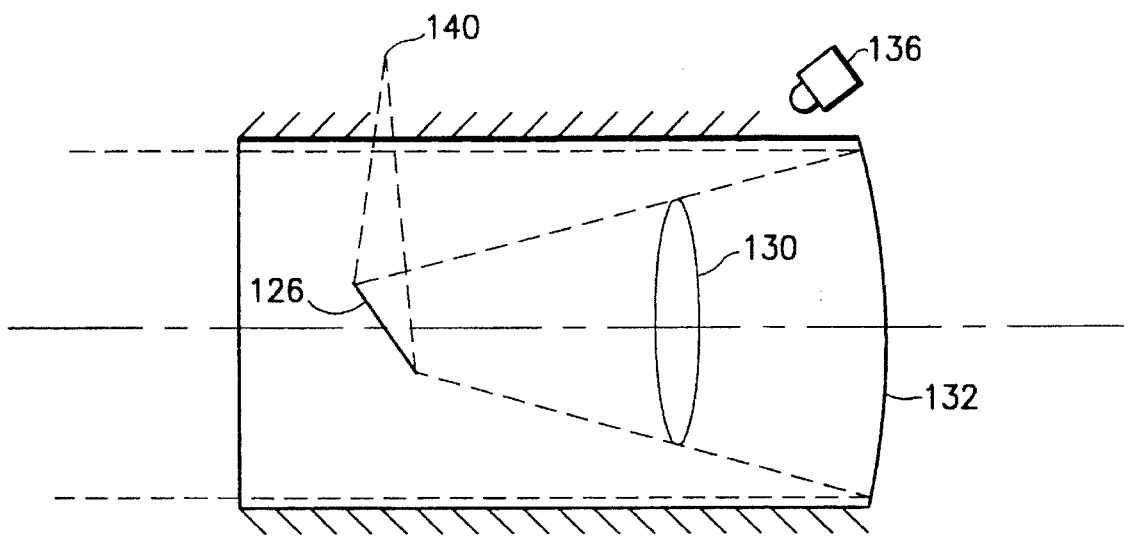
FIG. 9 illustrates a top view of yet another alternate embodiment of the optical system of the present invention.
Figure 10:
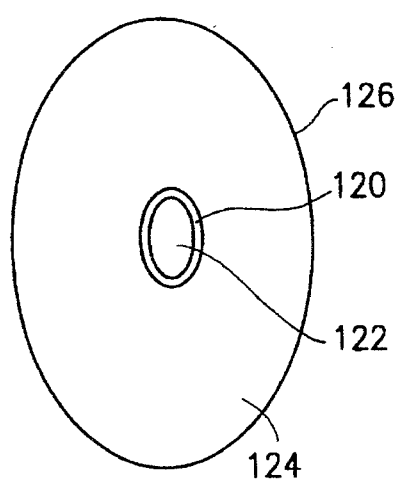
FIG. 10 illustrates a top view of a final alternate embodiment of the optical system of the present invention.

FIGS. 9 and 10 show the application to a Newtonian system, where a hologram 120 occupies a narrow ring, external of a first reflecting area 122 and inside a obscured area 124 of the secondary mirror 126, and the portion of the secondary mirror 126 inside the ring of the hologram is used to reflect a converging beam from a primary mirror 132 onto the focal plant. FIG. 10 shows an enlarged frontal view of the secondary mirror to clarify the location of the image forming HOE. The light source 136 is positioned to reflect off the hologram 120, and form a calibration image at a lateral calibration position.

While the original application, in any of the embodiments, would create an alignment/calibration image in the form of an artificial star, other applications could be envisioned where the preferred image would have other shapes, e.g. a cross or more complicated shape, which would improve the alignment/calibration properties of the system. Thus, while the invention has been particularly shown and described with respect to preferred embodiments thereof, it will be understood by those skilled in the art that changes in form and details may be made therein without departing from the scope and spirit of the invention.

What is claimed is:

1. An apparatus for providing an optical reference for an optical system, the apparatus comprising:

an enclosure;

an entrance aperture formed within a wall of the enclosure;

an optical axis extending through the entrance aperture;

an annular holographic optical element disposed in the entrance aperture around the optical axis;

an obscuring element disposed in the entrance aperture within the annular holographic optical element;

a source of electromagnetic radiation providing a diverging beam, the annular holographic optical element receiving a portion of the diverging beam, collimating the received portion of the diverging beam into a tubular collimated beam, and directing the tubular collimated beam along the optical axis parallel with and around the optical axis; and, an optical train receiving the tubular collimated beam and directing and focussing the tubular collimated beam onto a radiation receiving surface of a radiation detector of the optical system.

2. Apparatus as set forth in claim 1 wherein said source comprises a light emitting diode.

3. The apparatus as set forth in claim 1 wherein said source comprises an incandescent bulb.

4. The apparatus as set forth in claim 1 wherein said source comprises a monochromatic laser.

5. Apparatus as set forth in claim 1 wherein said annular holographic optical element operates in a reflective mode.

6. Apparatus as set forth in claim 1 wherein said annular holographic optical element operates in a transmissive mode.

7. Apparatus as set forth in claim 1 wherein the source is an indirect source of electromagnetic radiation providing the diverging beam, and wherein further the apparatus comprises a reflector disposed for receiving the diverging beam from the indirect source and for directing the diverging beam to the annular holographic optical element.

8. Apparatus as set forth in claim 1 wherein the optical train includes a substantially planar reflector disposed on the optical axis and having an aperture, the optical axis extending through the aperture, whereby radiation incident upon the obscuring element is not imaged by the radiation detector.

9. An optical system having an integral reference signal source, comprising:

an enclosure;

an entrance aperture formed within a wall of the enclosure;

an optical axis extending through the entrance aperture;

an annular holographic optical element disposed in the entrance aperture around the optical axis;

an obscuring element disposed in the entrance aperture within the annular holographic optical element;

a source of electromagnetic radiation providing a diverging beam, the annular holographic optical element receiving a portion of the diverging beam, collimating the received portion of the diverging beam into a tubular collimated beam, and directing the tubular collimated beam along the optical axis parallel with and around the optical axis;

a radiation detector having a radiation receiving surface; and, an optical train receiving the tubular collimated beam and directing and focussing the tubular collimated beam onto the radiation receiving surface of the radiation detector.

10. An optical system as set forth in claim 9 wherein said source comprises a light emitting diode.

11. An optical system as set forth in claim 9 wherein said source comprises an incandescent bulb.

12. An optical system as set forth in claim 9 wherein said source comprises a monochromatic laser.

13. An optical system as set forth in claim 9 wherein said holographic optical element operates in a reflective mode.

14. An optical system as set forth in claim 9 wherein the source is an indirect source of electromagnetic radiation providing the diverging beam, and wherein further the optical system comprises a reflector disposed for receiving the diverging beam from the indirect source and for directing the diverging beam to the annular holographic optical element.

15. An optical system as set forth in claim 9 wherein said annular holographic optical element operates in a transmissive mode.

16. An optical system as set forth in claim 9 wherein the optical train includes a substantially planar reflector disposed on the optical axis and having an aperture, the optical axis extending through the aperture, whereby radiation incident upon the obscuring element is not imaged by the radiation detector.

17. A method for providing an integral optical reference for an optical system, the optical system having an entrance aperture, an optical axis extending through the entrance aperture, and a radiation detector, the method comprising the steps of:

providing an annular holographic optical element within the entrance aperture around the optical axis;

operating a source of electromagnetic radiation to provide a diverging beam to the annular holographic optical element;

receiving a portion of the diverging beam with the annular holographic optical element;

collimating the received portion of the diverging beam with the annular holographic optical element into a tubular collimated beam;

directing the tubular collimated beam with the annular holographic optical element along the optical axis parallel with and around the optical axis to an optical train; and, directing and focussing the tubular collimated beam with the optical train onto a radiation receiving surface of the radiation detector to form an image.

18. A method as set forth in claim 17, further comprising the step of evaluating the image of the focussed beam to determine an operating condition of the optical system.

19. A method as set forth in claim 17, further comprising a step of comparing a presently measured position of the image with a previously measured position of the image to determine a movement of an element of the optical system.

* * * * *